United States Patent [19]

Schwinn

[11] Patent Number: 4,936,722

[45] Date of Patent: Jun. 26, 1990

[54] MILLING MACHINE POSITIONING APPARATUS

[76] Inventor: James J. Schwinn, 8424 White Wood Dr., Kewaskum, Wis. 53040

[21] Appl. No.: 396,306

[22] Filed: Aug. 21, 1989

[51] Int. Cl.$^5$ .............................................. B23Q 1/14
[52] U.S. Cl. ...................................... 409/220; 33/640;
33/642; 33/759; 408/16
[58] Field of Search ....................... 409/219, 220, 174;
408/16; 33/640, 641, 642, 755, 759, 764

[56] References Cited

U.S. PATENT DOCUMENTS

| | | | |
|---|---|---|---|
| 1,660,435 | 2/1928 | Craley | 409/220 |
| 2,240,753 | 5/1941 | Bouchard et al. | 33/764 |
| 3,069,781 | 12/1962 | Klaiban | 33/640 |
| 3,205,586 | 9/1965 | Mullen | 33/640 |
| 3,221,841 | 12/1965 | Kraklau, Jr. | 409/219 |
| 3,292,267 | 12/1966 | Wilfendink et al. | 33/641 |
| 3,316,646 | 5/1967 | Novey | 409/220 |
| 3,461,776 | 8/1969 | Hamori et al. | 409/219 |
| 3,781,999 | 1/1974 | Colangelo | 33/641 |
| 3,803,722 | 4/1974 | Hinkley | 33/628 |
| 3,885,314 | 5/1975 | Banas, Jr. | 33/764 |

Primary Examiner—Daniel Howell
Attorney, Agent, or Firm—Leon Gilden

[57] ABSTRACT

A milling machine positioning apparatus is set forth wherein a first "X" table is slidable relative to a milling machine in a first direction with a "Y" table slidable relative to the milling machine orthogonally relative to the "X" table, A first scale and second scale are oriented relative to the respective "X" and "Y" tables including a single, continuous scale with spring-biased friction reels securing each terminal end of the scale, wherein each friction reel is mounted at each end of the respective "X" and "Y" tables to enable a sliding positioning of the associated scale realtive to its associated table.

7 Claims, 1 Drawing Sheet

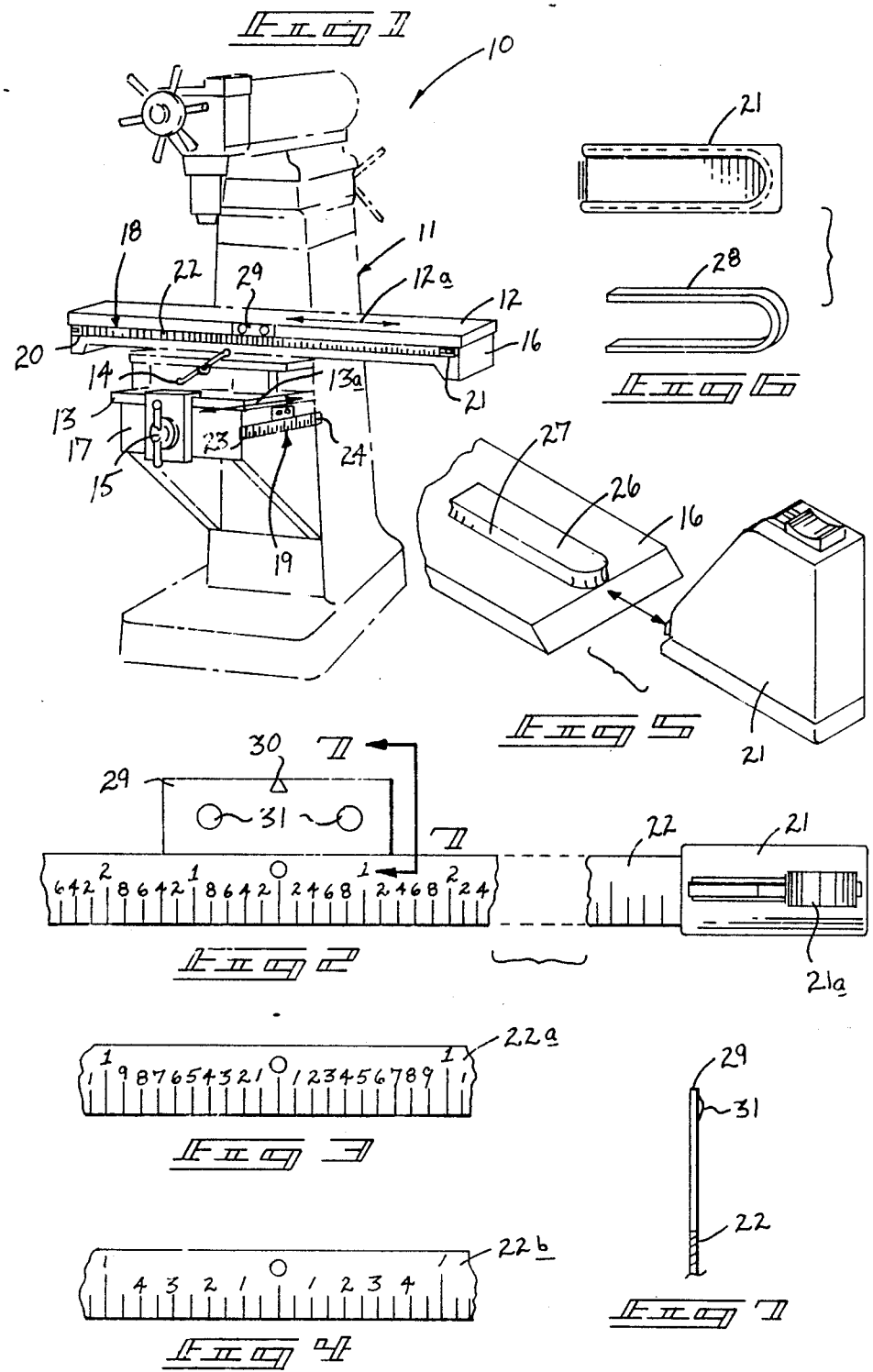

MILLING MACHINE POSITIONING APPARATUS

BACKGROUND OF THE INVENTION

1. Field of the Invention

The field of invention relates to milling mechines, and more particularly pertains to a new and improved milling machine utilizing a postionable scale relative to a respective table of the machine to continuously re-orient a zero position relative to a respective table.

2. Description of the Prior Art

The use of milling machines and measuring devices associated with milling machines are a developed and well known association in the prior art. Scales in the prior art are required to properly orient tool assemblies and the like relative to machines and accordingly such machines have attendent scale devices associated therewith. Scale devices of the prior art, however, fail to provide the flexibility of usage and are of a relatively complex organization relative to the instant invention providing a readily replaceable scale system utilizing various measuring systems easily mountable relative to a milling table and slidably positionable relative thereto continuously re-orient a zero position relative to the table. Examples of the prior art include U.S. Pat. No. 3,781,999 to Colangelo utilizing a scale positionable in overlying relationship relative to a spindle to orient a dial indicator relative to the spindle.

U.S. Pat. No. 3,803,722 to Hinkley provides for a planar drilling table utilizing a gauge member formed with a scale slidably and fixedly mounted orthogonally and laterally relative to the table to properly orient the drill relative to an associated work place.

U.S. Pat. No. 3,069,781 to Klaiban provides for a measuring gauge in use particularly with radial arm tools, wherein the gauge is formed of a first vertical scale slidably mounted relative to a horizontal scale to properly orient the tool member relative to an associated work piece.

U.S. Pat. No. 3,205,586 to Mullen provides a height indicator gauge utilizing a "U" shaped bracket provided with scale members thereon to properly associate an underlying saw relative to an associated upper table.

U.S. Pat. No. 3,292,267 to Wilterdink, et al., wherein a scale member is positioned overlying an associated table to provide an indicator member relative to the table for use in combination with machine tools.

As such, it may be appreciated that there is a continuing need for a new and improved milling machine positioning apparatus which address both the problems of ease of use and effectiveness in construction and in this respect, the present invention substantially fulfills this need.

SUMMARY OF THE INVENTION

In view of the foregoing disadvantages inherent in the known types of scale indicator apparatus now present in the prior art, the present invention provides a milling machine positioning apparatus wherein the same utilizes orthogonally arranged and selectively mountable scales positionable relative to an associated table to enable continuous adjustment of a zero indicator point as a reference relative to a milling head of the associated apparatus. As such, the general purpose of the present invention, which will be described subsequently in greater detail, is to provide a new and improved milling machine positioning apparatus which has all the advantages of the prior art indicator scale apparatus and none of the disadvantages.

To attain this, the present invention includes a milling machine with a first table and a second table orthogonally oriented relative to the first table, wherein each of the first and second tables overlie a support table and are movably mounted relative thereto by use of conventional adjustment members. The first and second tables each are provided with first and second scales mounted on a forward vertial face of each support table underlying the movable table and each scale is secured at each end to a spring-biased friction reel to enable repositioning and subsequent locking of a zero indicator reference of the scale relative to the respective first and second tables. The friction reels are removably mounted relative to the support tables by "U" shaped grooves relatively securable to grooved bosses orthogonally mounted integrally relative to the support tables.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved milling machine positioning apparatus which has all the advantages of the prior art scale indicators and none of the disadvantages.

It is another object of the present invention to provide a new and improved milling machine positioning apparatus which may be easily and efficiently manufactured and marketed.

It is a further object of the present invention to provide a new and improved milling machine positioning apparatus which is of durable and reliable construction.

An even further object of the present invention is to provede a new and improved milling machine positioning apparatus which is susceptible of a low cost of manufacture with regard to both materials and labor, and which accordingly is then susceptible of low prices of sale to the consuming public, thereby making such milling machine positioning apparatus economically available to the buying public.

Still yet another object of the present invention is to provide a new and improved milling machine positioning apparatus which provides in the apparatuses and methods of the prior art some of the advantages thereof, while simultaneously overcoming some of the disadvantages normally associated therewith.

Still another object of the present invention is to provide a new and improved milling machine positioning apparatus wherein the same emables continuous readjustment of a zero reference point relative to an overlying sliding "X" and "Y" table of a milling machine.

These together with other objects of the invention, along with the various features of novelty which characterize the invention, are pointed out with particularity in the claims annexed to and forming a part of this disclosure. For a better understanding of the invention, its operating advantages and the specific objects attained by its users, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the milling machine positioning apparatus as utilized by the instant invention.

FIG. 2 is an orthographic view taken in elevation of a first indicator scale utilized by the instant invention.

FIG. 3 is an orthographic view taken in elevation of a sectional portion of a second replacement scale utilized by the instant invention.

FIG. 4 is an orthographic view taken in elevation of a partial section of a third type scale utilized by the instant invention.

FIG. 5 is an isometric illustration, somewhat enlarged, illustrating securement of a friction reel relative to an associated support table.

FIG. 6 is an isometric illustration of the "U" shaped securement groove utilized by the friction reel.

FIG. 7 is an orthographic view taken along the lines 7—7 of FIG. 2 in the direction indicated by the arrows.

DESCRIPTION OF THE PREFERRED EMBODIMENT

With reference now to the drawings, and in particular to FIGS. 1 to 7 thereof, a new and improved milling machine positioning apparatus embodying the principles and concepts of the present invention and generally designated by the reference numeral 10 will be described.

More specifically, the milling machine positioning apparatus 10 essentially comprises a milling machine 11 formed with an overhead spindle relatively repositionable relative to an underlying first "X" table 12 mounted for adjustment laterally of the milling machine, as indicated by arrow 12a, with an underlying second "Y" table 13 mounted for movement of the table and the overlying "X" table in the direction indicated by the arrow 13a. The first table 12 is repositionable relative to an underlying first support table 16 by use of a first control handle 14 with the second "Y" table 13 slidably repositionable relative to a second underlying second support table 17 by use of a second control handle 15. The sliding relationship of the "X" and "Y" tables relative to the underlying support tables are effected by conventional worm gear mechanisms of conventional construction and available in the prior art.

A first elongate scale 18 formed of flexible metallic construction is positioned coextensively with a forward vertical face of the first table 12 with a second comparable scale 19 postioned underlying a forward face of the second table 13. The first scale 18 is mounted at each end to a respective first left spring-biased friction reel 20 and a first right spring-biased friction reel 21. The first pair of friction reels are mounted at each terminal end of the aforenoted vertical face of the first support table underlying the first table 12. The first scale 18 comprises a first single, continuous scale 22 formed with a predetermined scale which in FIG. 2 is illustrated in gradations of two tenths of an inch wherein the scale of FIG. 3 is configured as a one-tenth inch scale, and wherein the FIG. 4 scale is indicated as a metric scale. The type of scale desired is dependent upon the type of work to be mounted upon the milling machine and replacement of the scales and substitution therefore will be discussed in more detail below.

The second scale 19 comprises a second single continuous scale 25 formed of a single flexible metallic band as in the first scale 22 and is secured at each end to a second pair of friction reels comprising a second left friction reel 23 and a second right friction reel 24 that are each mounted at terminal ends of a vertical forward surface of the underlying second support table 17, as illustrated in FIG. 1. Reference to FIG. 5 illustrates the mounting of each friction reel relative to an associated terminal end of a support table, wherein a grooves boss 26 is orthogonally and integrally mounted extending outwardly relative to a terminal end of a vertical surface of a support table and is provided with an arcuate groove 27 coextensively formed about the sides of the boss. The arcuate groove 27 is received within a "U" shaped flange 28 that is integrally formed to a bottom of each friction reel to emable slidingly mounting each friction reel relative to an associated boss member. In this manner, various pairs of friction reels that include various gradations, such as metric and the like, may be substituted as desired relative to an associated "X" and "Y" table of a milling machine.

FIG. 7 is illustrative of the bracket member 29 mounted with a zero indicator 30 in alignment with a zero positioning of an associated scale to enhance manual grasping and repositioning of the scale relative to an overlying first or second "X" or "Y" table 12 or 13. The bracket member 29 includes friction pads 31 extending rearwardly thereof to enhance securement relative to a vertical support surface of a support table.

It should be noted that each of the friction spring-biased reels are formed with a latch member 21a for example, as illustrated in FIg. 2, frictionally clamp the associated scale once the associated scale is positioned in a predetermined orientation relative to an overlying "X" or "Y" table and thereafter may be selectively released in a rear position, as illustrated in FIG. 2, to enable further adjustment of the scale 22 or 25.

In usage, the scale member 22 for example is released for sliding relationship relative to an overlying "X" table 12 and is repositioned relative thereto by disengagement of associated friction lock members, such as 21a, and upon positioning of the scale relative to an overlying table, the lock members are once again engaged to secure the scale 22 at a predetermined orientation. Subsequently, the overlying "U" table is repositioned during a machining operation and its movement effected by rotation of a conventional control handle 14 for providing a rapid and easily utilized reference scale relative to an overlying machine tool table.

As to the manner of usage and operation of the instant invention, the same should be apperent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be emcompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by LETTERS PATENT of the United States is as follows:

1. A milling machine positioning apparatus comprising, in combination,
    a milling machine including a framework wherein said framework includes a spindle mounted overlying a first table, the first table slidably and adjustably mounted overlying a first support table, and
    a second table slidingly and adjustably mounted overlying a second support table, and
    the first support table mounted on the framework orthogonally relative to the second support table, and
    the first and second support tables each including a respective first and second elongate vertical face, and
    each vertical face including a respective first and second scale member coextensively mounted therethrough, and
    each scale member includes an elongate flexible scale slidably mounted overlying a respective first ans second vertical face, and each scale member including a left and right spring-biased friction reel member, each friction reel member mounting a respective terminal end of each scale therein, and each friction reel member further including a lock means to selectively lock the scale in a predetermined orientation relative to the reel member.

2. A milling machine positioning apparatus as set forth in claim 1 wherein each friction reel member is slidingly and selectively securable relative to a terminal end of a respective vertical face.

3. A milling machine positioning apparatus as set forth in claim 2 wherein each vertical face of each support table includes a grooved boss member integrally and orthogonally extending outwardly from the vertical face and the groove boss member is cooperative with a "U" shaped groove mounted to a bottom surface of each friction reel member.

4. A milling machine positioning apparatus as set forth in claim 3 wherein each scale includes a zero indicator reference position and including a bracket member extending upwardly from each zero reference position, wherein each bracket member further includes a reference point in alignment with the zero reference position.

5. A milling machine positioning apparatus as set forth in claim 4 wherein each bracket member further includes a plurality of friction pads extending rearwardly of each bracket member for frictional engagement with a respective vertical face of a respective support table.

6. A milling machine positioning apparatus as set forth in claim 5 wherein each bracket member comprises a planar flange extending upwardly and in alignment with an underlying scale.

7. A milling machine positioning apparatus as set forth in claim 6 wherein each scale comprises a flexible metallic elongate band.

* * * * *